INVENTOR.
DONALD W. READ

United States Patent Office 3,495,884
Patented Feb. 17, 1970

3,495,884
COMPOSITE MATERIAL FOR USE IN BEARING
STRUCTURES AND THE LIKE
Donald W. Read, Attleboro, Mass., assignor to Texas Instruments Incorporated, Dallas, Tex., a corporation of Delaware
Filed Jan. 2, 1968, Ser. No. 694,895
Int. Cl. F16c 9/06, 23/00, 41/00
U.S. Cl. 308—72                                    9 Claims

ABSTRACT OF THE DISCLOSURE

A composite material has a layer of bronze and a layer of steel interfacially bonded to one another. In an alternate form of the invention a third layer is bonded to the steel layer, the third layer being formed of a very thin layer of copper. The steel layer may be either low carbon steel or stainless steel. A bearing structure is made of the composite and uses the bronze layer as the bearing surface while the steel layer provides strength and stability to the structure. When the copper layer is employed, it provides corrosion resistance and reduces wear to forming tools. The material may also be used where the characteristics of solid bronze are normally used such as in washers, bushings, brushes, and the like.

---

It is an object of this invention to provide an improvement over the solid bronze formerly used in the above-noted applications and to provide an improved product which has a decreased amount of copper thereby providing a reduction in cost and to provide a product which is stronger than the solid material. It is a further object to provide a material suitable for use in bearing surfaces such as ball joints which is a reduction in cost and which is stronger.

Other objects and features will be in part apparent and in part pointed out hereinafter.

The invention accordingly comprises the constructions hereinafter described and the scope of the invention being indicated in the appended claims. In the accompanying drawings, in which one of various possible embodiments of the invention are illustrated:

Similar references indicate corresponding parts throughout the several views of the drawings.

The drawings are illustrative and not to exact scale since the small thickness of the layers involved have been exaggerated.

It is known to make bearing surfaces of solid Phosphor bronze, particularly the sockets for ball joints in windshield wiper assemblies. This material has been employed because of its corrosion and fatigue resistance together with good bearing properties. By Phosphor bronze is meant those copper alloys whose principal alloying element is tin and which have been deoxidized by the addition of up to approximately 0.5% phosphorus. Alloys of this type are relatively hard, strong and corrosion resistant and have good strength characteristics together with providing a good bearing surface in low velocity applications. However, in applications such as ball joint sockets it has been discovered that the part tends to lose shape and thereby increases the possibility of wear. This invention contemplates employing a composite of a Phosphor bronze layer and a stainless steel layer. The stainless steel provides strength and a reduction in cost of the copper bearing Phosphor bronze. In addition, it is proposed that in certain Phosphor bronze uses a Phosphor bronze steel composite may be employed where the steel is low carbon steel thus contributing ductility and strength together with further reduction in cost. In an alternative form it is proposed to employ a relatively thin layer of copper on the stainless steel or low carbon steel layer to provide manufacturing economies through reduced tool wear, and to provide protection of the steel surface during and after manufacture.

Figure 1:
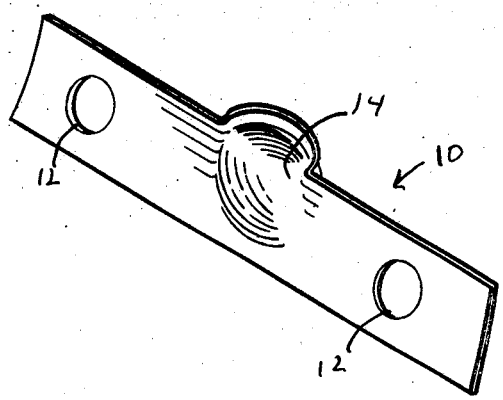
FIG. 1 is a view illustrating a typical application of the new multilayered bearing material used to form one half of a ball joint socket.
Figure 2:
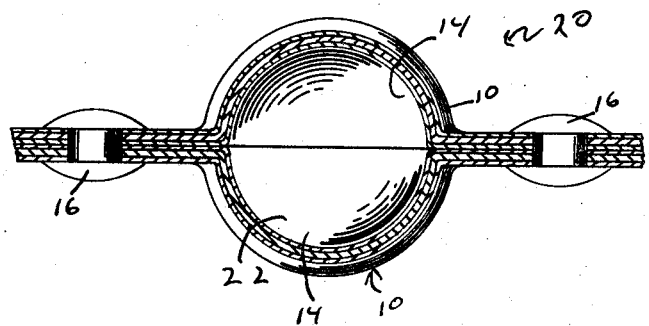
FIG. 2 is a plan view of a complete bearing structure employing the new composite material.

Referring now to the drawing, particularly FIG. 1 there is shown generally at 10 a portion of composite strip material which has been formed into a ball joint socket half. Element 10 is made of strip material such as that shown in FIG. 3 and includes mounting holes 12 and a bellied out portion 14 which forms one half of a ball joint socket half. In FIG. 2 there is shown generally at 20 a pair of elements 10 which have been joined together by appropriate fastening means 16 to form a ball joint socket. With socket well 22 formed by the mating of bellied out portions 14, there is formed a socket which may receive a ball or other bearing surface. This is particularly adapted to windshield wiper ball sockets in automotive applications.

Figure 3:
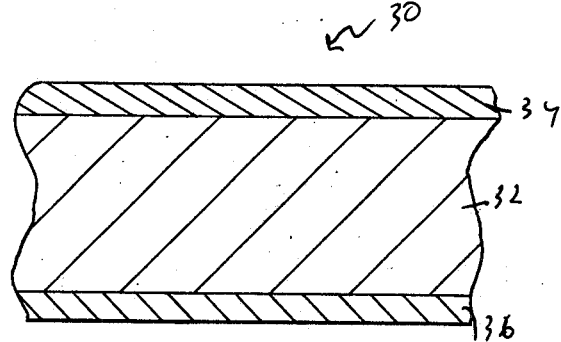
FIG. 3 is an enlarged fragmentary cross sectional view of the material shown in FIGS. 1 and 2.

In FIG. 3 there is shown in enlarged cross section area, a portion of a strip indicated generally as 30 from which the parts shown in FIGS. 1 and 2 are formed. The novel composite strip 30 includes a central, relatively thick layer of steel 32 and on one side a relatively thin layer of Phosphor bronze 34. In the preferred form, the other side of layer 32 has interfacially bonded thereto a thin layer of copper 36. Layers 32, 34 and 36 are interfacially bonded to one another and preferably metallurgically bonded in the solid phase as by a process such as that disclosed in U.S. Patent Nos. 2,691,815 and 2,753,623, for example. Other metallurgical bonding methods are not precluded however.

The strip 30 is in the range of from 0.010 to 0.110 inch depending on the strength of material required and the usage. The copper layer is as thin as practical and is generally less than 10% of the total thickness of the strip 30. The Phosphor bronze layer 34 varies in thickness depending on the bearing surface requirements and is in the range of from 5 to 20% of the total thickness of strip 30.

EXAMPLE

In a typical application for the novel, composite material disclosed herein, a Phosphor bronze metal layer 34 was bonded to a ferritic stainless steel 32 by the solid phase bonding technique disclosed in U.S. Patent No. 2,691,815. The Posphor bronze layer comprised 10% of the total thickness of the material and was a Phosphor bronze alloy A in which the copper plus phosphorus plus tin constituted a minimum of 99.5% of the alloy with the remainder being traces of iron, lead and zinc and in which the tin was between 3.5 and 5.8% by weight of the material while the phosphor was from 0.03 to 0.35% of the total. The ferritic stainless steel was type 430 which includes 14–16% by weight of chromium, a maximum of 0.12% of carbon and a maximum of 1.0% manganese, 0.04% phosphorus, 0.03% of sulphur and 1.0% of silicone, with the balance iron. The stainless steel layer former 83% by thickness of the total and a third layer of copper was bonded to the stainless steel layer, the copper forming 7% of the total thickness of the material. The composite was rolled to two thicknesses, one of which was 0.030 inch and the other being 0.015 inch. The thinner layer was used in an application in which it was to be connected to a backing strip thereby providing a reduced requirement for strength. The strip materials were then formed into a part as shown in FIG. 1 at element 10 and joined to form the composite ball at 40. The individual thicknesses were plus or minus 10% of the nominal thicknesses. The composite material represented a substantial decrease in cost over the solid Phosphor bronze formerly used together with a substantial increase in strength due to use of the steel material. In addition, the copper permitted reduced tool wear which could result from the stainless steel layer.

It will be understood that the novel material may also take the form of a Phosphor bronze/low carbon steel combination where the corrosion resistance of the stainless steel is not necessary and where its ductility and lower cost are advantageous. Alternatively, a copper layer covering can provide adequate corrosion resistance.

It will thus be understood that the objects of the invention have been achieved and substantial saving in expensive copper is achieved and, in addition, a substantially improved bearing material has been provided in that it has greater strength and thus reduces its tendency to wear out when used as a bearing.

In view of the above, it will be seen that the several objects of the invention are achieved and other advantageous results obtained. Since various changes could be made in the above constructions without departing from the scope of the invention, it is intended that all matter contained in the above description or shown in the accompanying drawing shall be interpreted as illustrative and not in a limiting sense.

I claim:

1. A bearing socket structure for receiving a revolvable ball therein, said socket structure being formed of a pair of metallic strips each having a socket half formed therein, said strips being joined such that said socket halves face one another to form a complete socket, each of said strips being formed of:
   a layer of Phosphor bronze forming a bearing surface on the inner surface of said socket half; and
   a layer of steel interfacially bonded to said layer of Phosphor bronze.

2. A bearing socket structure as set forth in claim 1 wherein each of said strips has an outer layer of copper interfacially bonded to said steel layer.

3. A bearing socket structure as set forth in claim 2 wherein the Phosphor bronze layer of each of said strips is in the range from 5 to 20% of the thickness of the strip material and the copper layer of each of said strips has a thickness less than about 10% of the total thickness of the strip material.

4. A bearing socket structure for receiving a revolvable ball therein, said socket structure being formed of a pair of metallic strips each having a socket half formed therein, said strips being joined such that said socket halves face one another to form a complete socket, each of said strips being formed of:
   a layer of Phosphor bronze forming a bearing surface on the inner surface of said socket half;
   an intermediate layer of stainless steel; and
   a layer of copper forming the outer layer, the layers of each strip being interfacially bonded to one another in the solid phase.

5. A bearing socket structure as set forth in claim 4 wherein, in each of said strips, the Phosphor bronze layer has a thickness of approximately 10% of the total thickness of the strip material, the stainless steel layer has a thickness of approximately 83% of the total thickness of the strip material, and the copper layer has a thickness of approximately 7% of the total thickness of the strip material.

6. A composite bearing strip material useful in forming bearing socket structures comprising a Phosphor bronze layer having selected elongation and bearing surface properties, an intermediate strength layer of steel providing a modulus of elasticity in the composite material greater than that of said Phosphor bronze material while providing elongation properties in the composite material comparable to those of Phosphor bronze, and an outer layer of copper improving the yield strength of said composite material over the yield strength of said combination of said Phosphor bronze and steel layers alone, the layers of the strip material being interfacially bonded to one another.

7. A composite strip material as set forth in claim 6 wherein the Phosphor bronze layer is in the range from 5 to 20% of the thickness of the strip material and the copper layer has a thickness less than about 10% of the total thickness of the strip material.

8. A composite strip material as set forth in claim 7 wherein the intermediate layer is formed of stainless steel interfacially bonded to said Phosphor bronze and copper layers in the solid phase.

9. A composite strip material as set forth in claim 8 wherein the Phosphor bronze layer has a thickness of approximately 10% of the total thickness of the strip material, the stainless steel layer has a thickness of approximately 83% of the total thickness of the strip material, and the copper layer has a thickness of approximately 7% of the total thickness of the strip material.

References Cited

UNITED STATES PATENTS

| | | | |
|---|---|---|---|
| 1,001,669 | 8/1911 | Monnot | 29—196.3 |
| 1,700,173 | 1/1929 | Marshall | 29—196.3 X |
| 2,333,227 | 11/1943 | Bagley | 308—237 X |
| 2,443,856 | 6/1948 | Hermanny. | |
| 2,916,337 | 12/1959 | Fike | 308—237 |
| 3,403,010 | 9/1968 | MacDonald | 29—196.3 X |
| 3,405,228 | 10/1968 | Polizzano | 29—196.3 X |

MARTIN P. SCHWADRON, Primary Examiner

LUCIOUS L. JOHNSON, Assistant Examiner

U.S. Cl. X.R.

29—196.3; 308—237, 241